United States Patent
Ham

(10) Patent No.: US 12,211,164 B2
(45) Date of Patent: Jan. 28, 2025

(54) SIMULATING AND EDITING OF GARMENT OF HIERARCHICAL STRUCTURE

(71) Applicant: CLO Virtual Fashion Inc., Seoul (KR)

(72) Inventor: Hyung Gi Ham, Seoul (KR)

(73) Assignee: CLO Virtual Fashion Inc., Seoul (KR)

( * ) Notice: Subject to any disclaimer, the term of this patent is extended or adjusted under 35 U.S.C. 154(b) by 138 days.

(21) Appl. No.: 18/073,184

(22) Filed: Dec. 1, 2022

(65) Prior Publication Data

US 2023/0102069 A1 Mar. 30, 2023

Related U.S. Application Data

(63) Continuation-in-part of application No. PCT/KR2022/004679, filed on Apr. 1, 2022.

(30) Foreign Application Priority Data

Apr. 2, 2021 (KR) .................. 10-2021-0043047
Dec. 31, 2021 (KR) .................. 10-2021-0193735

(51) Int. Cl.
*G06T 19/20* (2011.01)
*G06T 13/40* (2011.01)

(52) U.S. Cl.
CPC .............. *G06T 19/20* (2013.01); *G06T 13/40* (2013.01); *G06T 2210/16* (2013.01);
(Continued)

(58) Field of Classification Search
CPC ............. G06F 3/04845; G06F 2113/12; G06F 2203/04806; G06F 2203/04808;
(Continued)

(56) References Cited

U.S. PATENT DOCUMENTS 10,842,680 B1 * 11/2020 Weiler .................. G16H 20/00
2011/0166682 A1 7/2011 Brooking et al.
(Continued)

FOREIGN PATENT DOCUMENTS

JP 4977742 B2 7/2012
KR 10-1775327 B1 9/2017
(Continued)

OTHER PUBLICATIONS

PCT International Search Report and Written Opinion, PCT Application No. PCT/KR2022/004679, Jun. 22, 2022, 12 pages.

*Primary Examiner* — Ming Wu
(74) *Attorney, Agent, or Firm* — WTA Patents

(57) ABSTRACT

A method and apparatus for simulating a garment according to an example embodiment receive a user input for selecting, in a simulated three-dimensional (3D) garment worn on an avatar, any one of a plurality of objects corresponding to a next depth level to a depth level which is being currently displayed among depth levels for hierarchically displaying one or more pieces included in the 3D garment and two-dimensional (2D) patterns forming each of the pieces, display the next depth level by controlling visualization of the plurality of objects such that the selected object is not covered by at least one of the remaining objects other than the selected object of the plurality of objects, deform the selected object based on an input for editing the selected object corresponding to the next depth level, deform the 3D garment by reflecting deformation of the selected object, and output the deformed 3D garment.

26 Claims, 16 Drawing Sheets

2D patterns 310   Piece 320

3D garment 330

(52) U.S. Cl.
CPC ............... *G06T 2219/2012* (2013.01); *G06T 2219/2021* (2013.01); *G06T 2219/2024* (2013.01)

(58) Field of Classification Search
CPC ........ G06F 3/011; G06F 3/017; G06F 3/0346; G06F 3/04815; G06F 3/04842; G06F 3/04847; G06F 3/04883; G06F 30/12; G06F 30/20; G06T 19/20; G06T 2200/24; G06T 2210/16; G06T 2210/62; G06T 13/40; G06T 2219/016; G06T 2219/2012; G06T 2219/2021; G06T 2219/2024
See application file for complete search history.

(56) References Cited

U.S. PATENT DOCUMENTS

| | | | | |
|---|---|---|---|---|
| 2020/0242834 A1* | 7/2020 | Chachek | ................ | G06T 19/20 |
| 2020/0349758 A1* | 11/2020 | Paulson | ................ | G06T 15/04 |
| 2020/0402126 A1* | 12/2020 | Choche | ................ | A41H 3/007 |

FOREIGN PATENT DOCUMENTS

| | | | |
|---|---|---|---|
| KR | 10-2173900 | B1 | 11/2020 |
| KR | 10-2195190 | B1 | 12/2020 |
| KR | 10-2228098 | B1 | 3/2021 |

\* cited by examiner

Depth0

SIMULATING AND EDITING OF GARMENT OF HIERARCHICAL STRUCTURE

CROSS-REFERENCE TO RELATED APPLICATIONS

This application is a bypass continuation-in-part application of International PCT Application No. PCT/KR2022/004679 filed on Apr. 1, 2022, which claims the benefit of Republic of Korea Patent Application No. 10-2021-0043047 filed on Apr. 2, 2021, and Republic of Korea Patent Application No. 10-2021-0193735 filed on Dec. 31, 2021, the entire disclosure of which are incorporated herein by reference for all purposes.

BACKGROUND

1. Field of the Invention

The disclosure relates to simulating and designing of a garment, more specifically to facilitating simulation or designing of a garment with multiple pieces.

2. Description of the Related Art

A garment is of a three-dimensional (3D) shape when worn by a person, but is formed of two-dimensional (2D) fabric pieces cut according to a 2D pattern. Since the garment is made of fabric that is flexible, its shape may be changed in various ways according to body shape or movement of the person wearing the garment.

When a 3D garment is placed on an avatar and the garment is to be modified, it may be difficult to identify the shapes of patterns to be modified because multiple 2D patterns of the garment may overlap with each other. In addition, when a user interface (UI) element for modifying a 2D pattern overlaps with a UI element for modifying another 2D pattern, it is difficult to select the UI element of the 2D pattern for modification because it is occlude. In addition, since the 2D pattern is occluded by the other 2D pattern, it is difficult to properly perceive the result of modification.

SUMMARY

Embodiments relate to a garment simulation where a piece of a three-dimensional (3D) garment is displayed at a first depth level. At the first depth level, a first granular level of editing is enabled for the piece that comprises two-dimensional (2D) patterns. Selection of one of the 2D patterns is received responsive to displaying the piece. Displaying is performed at a second depth level by visualizing the selected 2D pattern in a manner in which the selected 2D pattern is not occluded by unselected one or more 2D patterns or other pieces of the 3D garment. The second granular level of editing that is finer than the first granular level is enabled for the selected 2D pattern in the second depth level. First input to deform the selected 2D pattern is received in the second depth level responsive to display the selected 2D pattern. A deformed version of the selected piece is displayed by reflecting the deformation of the selected pattern.

In one or more embodiments, the first level of editing comprises editing an overall configuration of the selected piece but not configurations of the 2D patterns, and the second level of editing comprises editing a configuration of the selected 2D pattern.

In one or more embodiments, the 3D garment is placed on an avatar.

In one or more embodiments, the displaying of the selected 2D pattern comprises displaying the unselected one or more 2D patterns without adjusting a transparency of the unselected one or more of 2D patterns.

In one or more embodiments, the displaying of the selected 2D pattern comprises displaying the unselected one or more patterns of the piece transparently or translucently or lower selection priority of the unselected one or more 2D patterns of the piece.

In one or more embodiments, the displaying of the selected 2D pattern comprises displaying at least one of outlines of the selected 2D pattern and points on the outlines of the 2D patterns.

In one or more embodiments, the displaying of the selected 2D pattern comprises displaying selected 2D pattern in a different color than unselected one or more 2D patterns or highlighting selected 2D pattern.

In one or more embodiments, a plurality of pieces of the 3D garment including the selected piece are displayed in a zero depth level where editing is disabled for the plurality of pieces. Selection of the plurality of pieces of the 3D garment is received responsive to displaying the 3D garment in the zero depth level.

In one or more embodiments, the selected pattern is displayed in a conspicuous manner to indicate activation of the selected pattern for editing in the second depth level.

In one or more embodiments, user interfaces (UIs) for editing the selected 2D pattern is displayed responsive to receiving selection of the one of the 2D patterns.

In one or more embodiments, second input at an empty space other than at a region of a screen occupied by the 2D patterns is received responsive displaying at the second depth level. The selected piece is displayed at the first depth level responsive to receiving the second input.

In one or more embodiments, a first set of editing elements in user interfaces (UIs) applicable to the piece in the first depth level is active responsive to displaying at the first depth level.

In one or more embodiments, the first set of editing elements comprises at least one of a first element configured to edit a surface of the piece, a second element configured to edit a line of the piece, a third element configured to edit a point of the piece, and a fourth element configured to edit a supplemental material corresponding to the piece.

In one or more embodiments, a second set of editing elements in user interfaces (UIs) applicable to the selected 2D pattern in the second depth level is activated responsive to displaying at the second depth level.

In one or more embodiments, the first set of editing elements comprises at least one of a first element configured to edit a surface of the selected 2D pattern, a second element configured to edit a line of the selected 2D pattern, a third element configured to edit a point of the selected 2D pattern, and a fourth element configured to edit a supplemental material corresponding to the selected 2D pattern.

In one or more embodiments, a sub tool usable in parallel with an editing function is activated responsive to receiving second input of a preset type in a simulation space where the 3D garment is displayed. The sub tool comprises at least one of: a depth level selection tool configured to transition between depth levels including the first depth level and the second depth level; a line editing tool configured to edit a style line in the 3D garment, or pieces of the 3D garment; and a sewing tool configured to perform sewing in response to modification of sewing lines of the selected 2D pattern.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
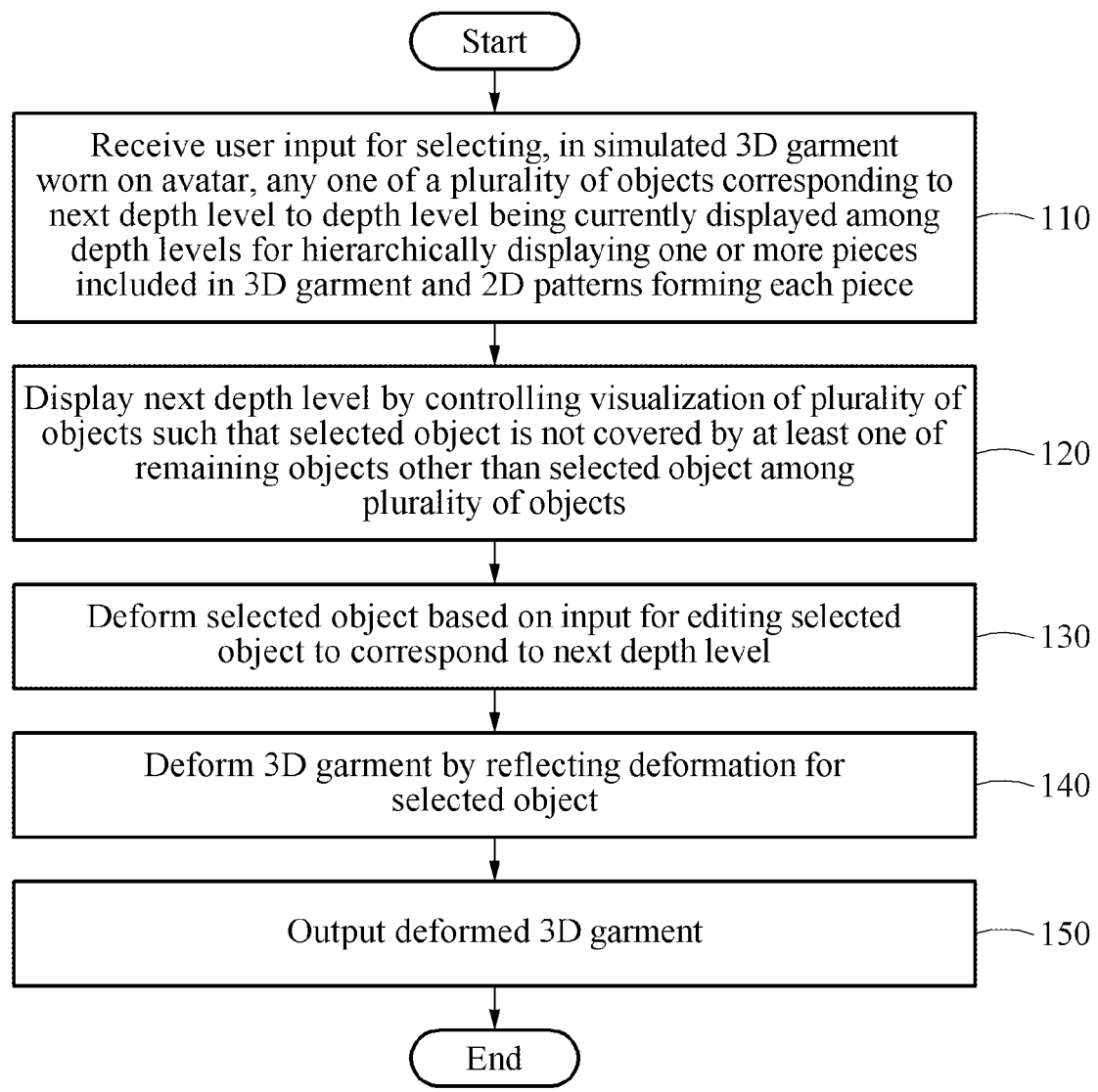
FIG. 1 is a flowchart illustrating a garment simulation method, according to an example embodiment.

Hereinafter, example embodiments will be described in detail with reference to the accompanying drawings. However, since various modifications may be made to example embodiments, the scope of the application is not limited or confined by these example embodiments. It should be understood that all modifications, equivalents and replacements for the example embodiments are included within the scope of the disclosure.

The terminology used herein is for the purpose of describing particular example embodiments only and should not be construed as limiting. As used herein, the singular forms are intended to include the plural forms as well, unless the context clearly indicates otherwise. It will be further understood that the terms "comprise," "have," or "include" when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

In addition, when describing the example embodiments with reference to the accompanying drawings, like reference numerals refer to like components and a repeated description related thereto will be omitted. In describing the example embodiments, if it is determined that a detailed description of a well-known related technology unnecessarily obscures the gist of the example embodiments, the detailed description thereof will be omitted.

In addition, in describing components of the example embodiments, terms such as first, second, A, B, (a), and (b) may be used. These terms are used only to distinguish one component from another component, and an essence, order or sequence of the component is not limited by the terms. When it is mentioned that one component is "connected," "coupled," or "joined" to another component, it may be understood that the one component is directly connected or joined to another component or that still other component is interposed between the two components. In addition, it should be noted that if it is described in the specification that one component is "directly connected" or "directly joined" to another component, still other component may not be present therebetween.

A component included in any one example embodiment and a component having the common function are described using the same name in other example embodiments. Unless otherwise stated, descriptions in one example embodiment may be applied to other embodiments as well, and detailed descriptions within an overlapping range will be omitted.

FIG. 1 is a flowchart illustrating a garment simulation method, according to an example embodiment. In example embodiments described below, each operation may be sequentially performed, but is not necessarily performed sequentially. For example, the order of each operation may be changed, and at least two operations may be performed in parallel.

Referring to FIG. 1, a process in which a garment simulation apparatus according to an example embodiment generates a deformed 3D garment by performing operations 110 to 150, as illustrated. Operations 110 to 150 may be performed, for example, by a processor 1130 of a garment simulation apparatus 1100 illustrated below in FIG. 11.

In operation 110, the garment simulation apparatus receives a user input for selecting, in a simulated 3D garment placed on an avatar, one of a plurality of pieces of a garment that are currently displayed in a current level so that a transition may be made to a next level where only the selected piece of the garment is displayed. The garment is hierarchically structured so that it is divided into one or more pieces, and each piece is also divided into one or more patterns. For example, when a depth level which is being currently displayed is depth level 1, a next depth level to the level may be depth level 2. A concept of the depth level and components of the depth level according to an example embodiment will be described in detail below with reference to FIGS. 2 and 3.

In operation 120, the garment simulation apparatus displays the next depth level by visualizing one of a plurality of pieces such that the piece selected in operation 110 is not occluded by unselected pieces.

The garment simulation apparatus may activate and visualize a piece selected by a user. The phrase 'activate and visualize' refers to allowing the user to select the piece for an editing interface such that the user may edit configurations (e.g., point, line, surface, supplemental material, etc.) of the piece. A method for the garment simulation apparatus to activate and visualize the selected object will be described in detail below with reference to FIG. 4.

In addition, the garment simulation apparatus may inactivate at least one of the remaining pieces other than the selected pieces by displaying the unselected pieces transparently or translucently.

The garment simulation apparatus according to an example embodiment may operate according to one of (i) a work mode of performing editing functions that may be performed for each depth level and (ii) a transition mode for switching depth levels. For example, in the case that some patterns of a top piece are selected while the operation mode of the garment simulation apparatus is set to the transition mode, the garment simulation apparatus may transition or switch the depth level from, for example, depth level 1 to depth level 2. On the other hand, in the case that some patterns of the top piece are selected in the work mode, the garment simulation apparatus may activate a UI of corresponding functions such that various functions may be performed on a selected pattern.

The work mode and the transition mode according to an example embodiment may have different functions, or may share similar or same functions. For example, the garment simulation apparatus may display a next depth level to correspond to a user input for selecting any one of a plurality of pieces or patterns generated in the transition mode to transition to the next depth level. When the garment simulation apparatus is in the movement mode, transition between depth levels is performed, as described below in more detail with reference to FIGS. 5 through 8.

In operation 130, the garment simulation apparatus deforms the selected piece based on an editing input that is provided in the next depth level. Deforming of the selected piece is described below in more detail with reference to FIG. 9.

In operation 140, the garment simulation apparatus deforms the 3D garment by reflecting deformation in operation 140 to the selected object.

In operation 150, the garment simulation apparatus outputs the 3D garment deformed in operation 140.

According to an example embodiment, when a user input generated in a simulation space corresponds to a preset type, the garment simulation apparatus may activate a sub tool usable in parallel with an editing function to edit the 3D garment. At this time, the sub tool may include at least one of (i) a depth level selection tool for transitioning between a current depth level being displayed and the next depth level, (ii) a line editing tool for editing a style line in the 3D garment or the pieces, and (ii) a sewing tool for performing sewing operation based on modified sewing lines of the 2D patterns.

In an example embodiment, 'style lines' refer to lines representing style and/or silhouette of a 3D garment such as (i) sewing lines of the 3D garments indicating lines along which 2D patterns are sewn to form the 3D garments, (ii) silhouette outlines of 3D garments, and (iii) incision lines added to stylize the 3D garments. Hereinafter, the 'style line' refers to a 3D line of the 3D garment whereas a 'line' or 'stripe' refers to a 2D line of pieces and/or 2D patterns.

Figure 2:
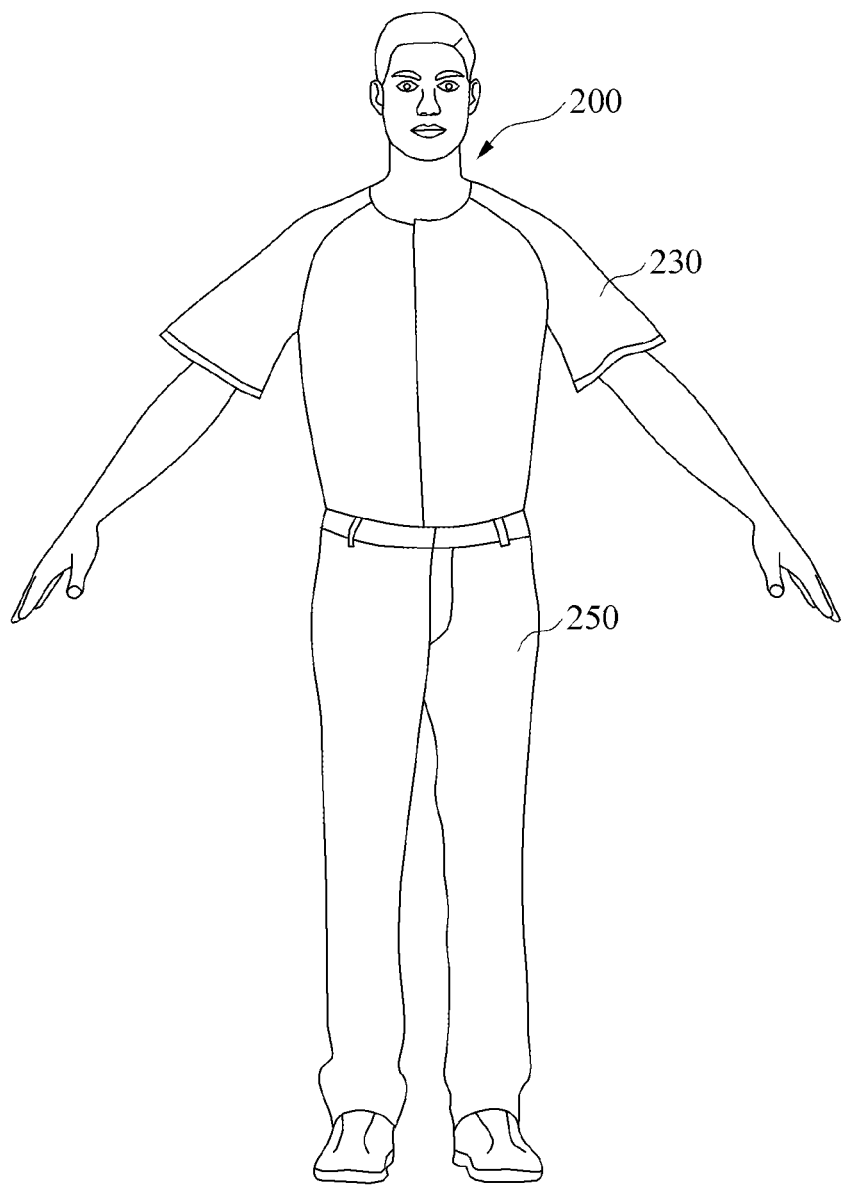
FIG. 2 is a diagram illustrating a concept of a depth level, according to an example embodiment.

FIG. 2 is a diagram illustrating a concept of a depth level, according to an example embodiment, where a 3D garment includes a top 230 and a bottom 250 as pieces worn on an avatar 200. In general, the 3D garment may be designed, for example, through two operations of modifying 2D patterns forming a garment in a 2D space, and then checking the result of modification of 2D pattern pieces in a 3D space.

For example, it is assumed that modification performed on the 2D patterns in the 2D space is performed in the 3D space. As illustrated in FIG. 2, if 2D patterns of the top 230 is tucked inside the bottom 250 in an overlapping manner. Such overlap of the top 230 and the bottom 250 makes it difficult to perceive modification made to the shape of the top 230.

In addition, when the user wants to modify a silhouette of the hem of the top 230, a first UI for modification of the top 230 and a second UI for modification of the bottom 250 overlap each other because the hem of the top 230 is partially or whole occluded and overlapped by the bottom 250. Accordingly, it may be difficult to select the second UI provided for modification of the top 230.

In addition, during modification of the hem of the top 230, it may be difficult to predict or perceive the end result of modification due to the fact that the first UI for modification is occluded. In other words, a changed in the hem of the modified top 230 is difficult to perceived since it is tucked under the bottom 250.

Among other advantages, embodiments use depth levels to place constrain on edits that may be made at different levels of hierarchy. In this way, even if several modifiable pieces or patterns are intricately entangled in a 3D simulation space, a piece or pattern for modification may be separated from others easily for visualization and modification. While only a piece or pattern may be modified in a depth level, transitions between different depth levels may be made promptly to make desired modifications. Each depth level will be described in more detail below with reference to FIG. 3.

Figure 3:
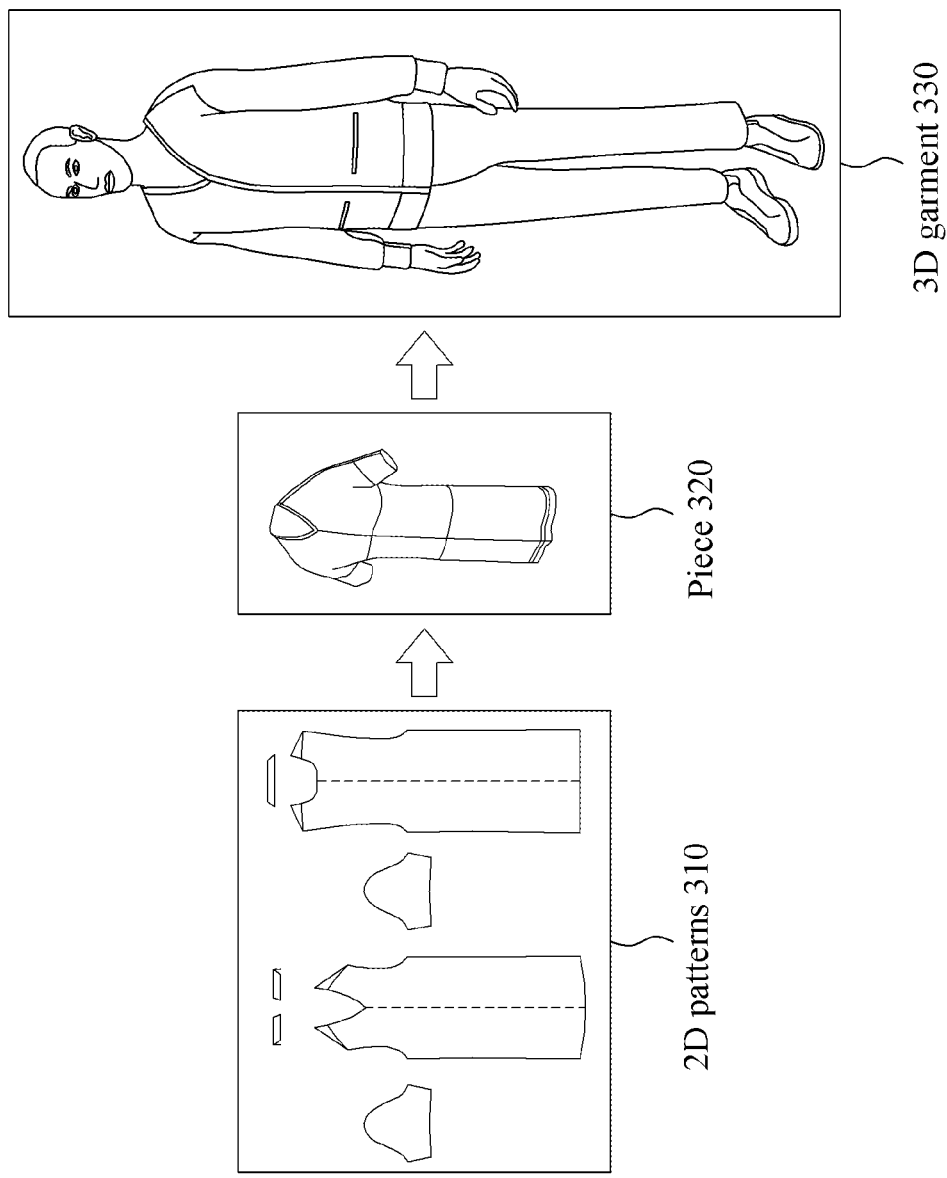
FIG. 3 is a diagram illustrating patterns and pieces forming a 3D garment, according to an example embodiment.

FIG. 3 is a diagram illustrating patterns and pieces forming a 3D garment, according to an example embodiment. Referring to FIG. 3, 2D patterns 310, a pieces 320, and a 3D garment 330, according to an example embodiment are illustrated. The 2D patterns 310 may correspond to each body part forming the 3D garment 330. The 2D patterns 310 may be virtual garment patterns modeled as a set of a plurality of polygons for simulation of the 3D garments 330. The 2D patterns 310 may be referred to as 'pattern pieces' in that they correspond to some pieces of cloth forming the 3D garment 330. The 2D patterns 310 may be modeled, for example, as a polygonal mesh that includes a plurality of polygons (e.g., a triangle or a quadrangle).

According to example embodiments, the polygonal mesh may be modeled in various ways. For example, vertices of a polygon included in the mesh are point mass, and sides of the polygon may be expressed as springs having elasticity connecting the mass. Accordingly, the 3D garment 330 according to an example embodiment may be modeled by, for example, a mass-spring model. The springs may have respective resistance to, for example, stretch, shear, and bending, depending on properties of fabric used. Alternatively, the mesh may be modeled as a strain model. The polygon included in the mesh for example, may be modeled as triangles or may be modeled as polygons greater than or equal to quadrilateral. In some cases, when modeling a 3D volume, the mesh may be modeled as a 3D polyhedron. The vertices of the polygon(s) included in the mesh may be moved by, for example, an external force such as gravity and an internal force such as stretch, shear, and bending. If force applied to each vertex is calculated by calculating the external and internal forces, displacement velocity and movement of each vertex may be obtained. A movement of the 3D garment 330 may be simulated through a movement of vertices of polygons forming the mesh in each time operation. For example, when the 3D garment 330 formed of the polygonal mesh is worn on the 3D avatar, a natural 3D virtual garment based on the laws of physics may be implemented. The vertices of the polygon(s) included in the mesh may move according to an action of the external force such as gravity and the internal force of stretch, shear, and bending. If force applied to each vertex is determined based on the external and internal forces, the displacement and movement velocity of each vertex may be obtained. In addition, movement of a virtual garment may be simulated through movement of polygonal vertices of a mesh at each time step. By putting the 2D patterns 310 formed of the polygonal mesh on the 3D avatar, the natural-looking piece 320 or the 3D garment 330 based on the laws of physics may be implemented.

The pieces 320 may correspond to a group of the 2D patterns 310 connected by sewing. The 3D garment 330 may be formed of, for example, two pieces such as a top and a bottom, or may be formed of one piece such as a dress. The pieces 320 may correspond to 3D pieces.

The 3D garment 330 described herein includes all garments displayed on a 3D screen, in other words, all virtual 3D garments worn on the avatar in a 3D simulation space. The 3D garment 330 according to an example embodiment may include, for example, at least one of a virtual garment suitable for the user's body size, a virtual garment for a 3D virtual character, and a virtual garment for a 3D virtual avatar.

The above-mentioned 2D patterns 310, the piece(s) 320, and the 3D garment 330 may correspond to objects corresponding to depth levels displayed hierarchically, according to an example embodiment.

A depth level 0 ('Depth 0') may correspond to a level at which a final result according to modification in a shape of the 3D garment may be seen and checked as it is. The 3D garment 330 may be displayed on the screen to correspond to 'Depth 0'. When the depth level which is being currently displayed is 'Depth 0', the 3D garment 330 may be displayed on the screen. At 'Depth 0', a separate UI for modification may not be visualized.

A depth level 1 ('Depth 1') is a level at which the 3D garment may be entirely modified. The piece 320 may be displayed on the screen to correspond to 'Depth 1'. When the depth level which is being currently displayed is 'Depth 1', the piece 320 may be displayed on the screen. At 'Depth 1', a UI for modifying the piece 320 selected by the user in the 3D garment 330 may be visualized. For example, it is assumed that a 3D garment displayed on the screen is formed of two pieces of a top and a bottom, and the top piece is selected by the user. The garment simulation apparatus visualizes a UI that may modify a selected top piece as a whole, and an unselected bottom piece may be made transparent or translucent.

Depth level 2 ('Depth 2') is a level at which detailed details of the 3D garment 330 may be modified. The 2D patterns 310 may be displayed on the screen to correspond to 'Depth 2'. At 'Depth 2', the 2D patterns 310 forming the piece 320 may be modified. The garment simulation apparatus may visualize a UI for modification of a 2D pattern selected by the user, and may not visualize the UI for a 2D pattern not selected by the user.

Figure 4:
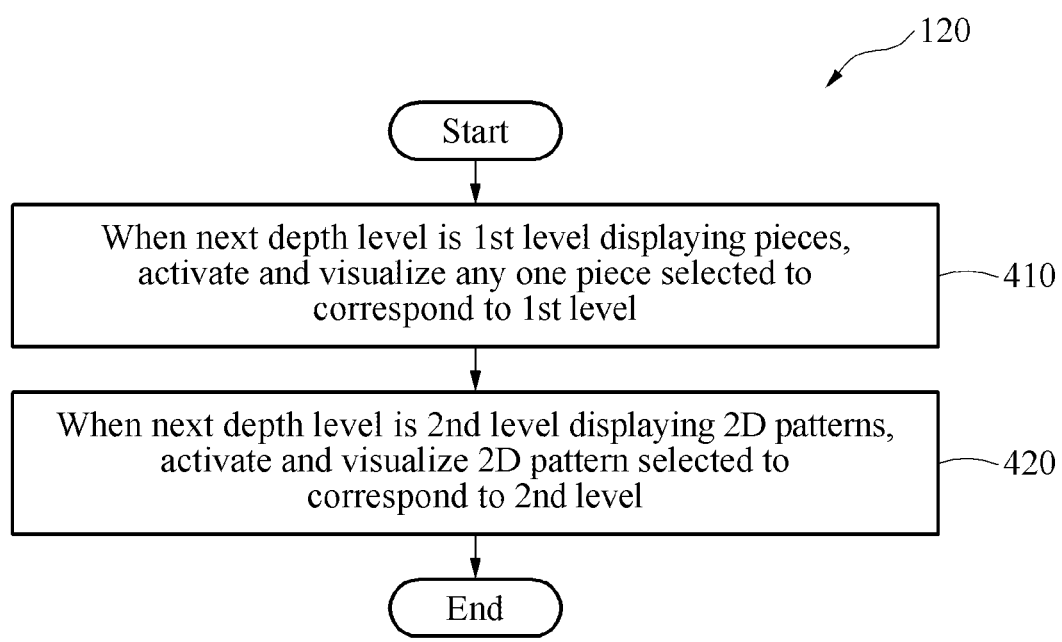
FIG. 4 is a flowchart illustrating a method of activating and visualizing a selected object, according to an example embodiment.

FIG. 4 is a flowchart illustrating a method of activating and visualizing a selected piece or pattern according to an example embodiment. In example embodiments below, each operation may be sequentially performed, but is not necessarily performed sequentially. For example, the order of each operation may be changed, and at least two operations may be performed in parallel. Referring to FIG. 4, a process of activating and visualizing a selected piece or pattern through operations 410 to 420 by a garment simulation apparatus according to an example embodiment is illustrated. Operations 410 and 420 may be performed, for example, by the processor 1130 of the garment simulation apparatus 1100 illustrated below in FIG. 11.

Figure 5A:
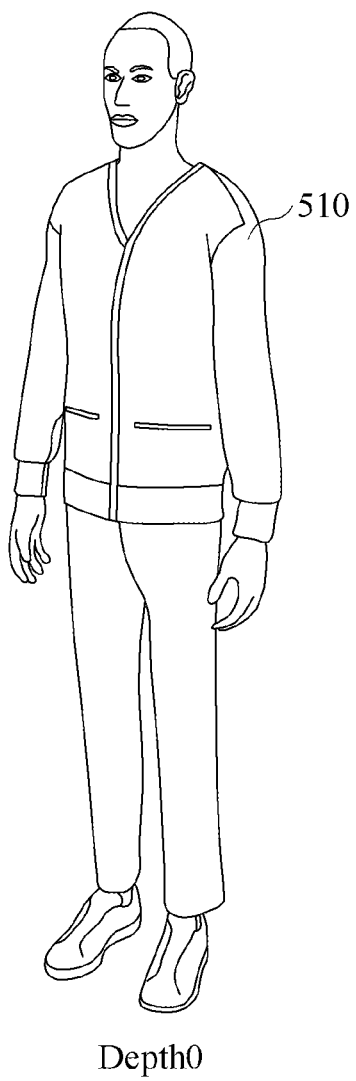
FIGS. 5A to 5C are diagrams illustrating movement between depth levels and visualization, according to an example embodiment.
Figure 5B:
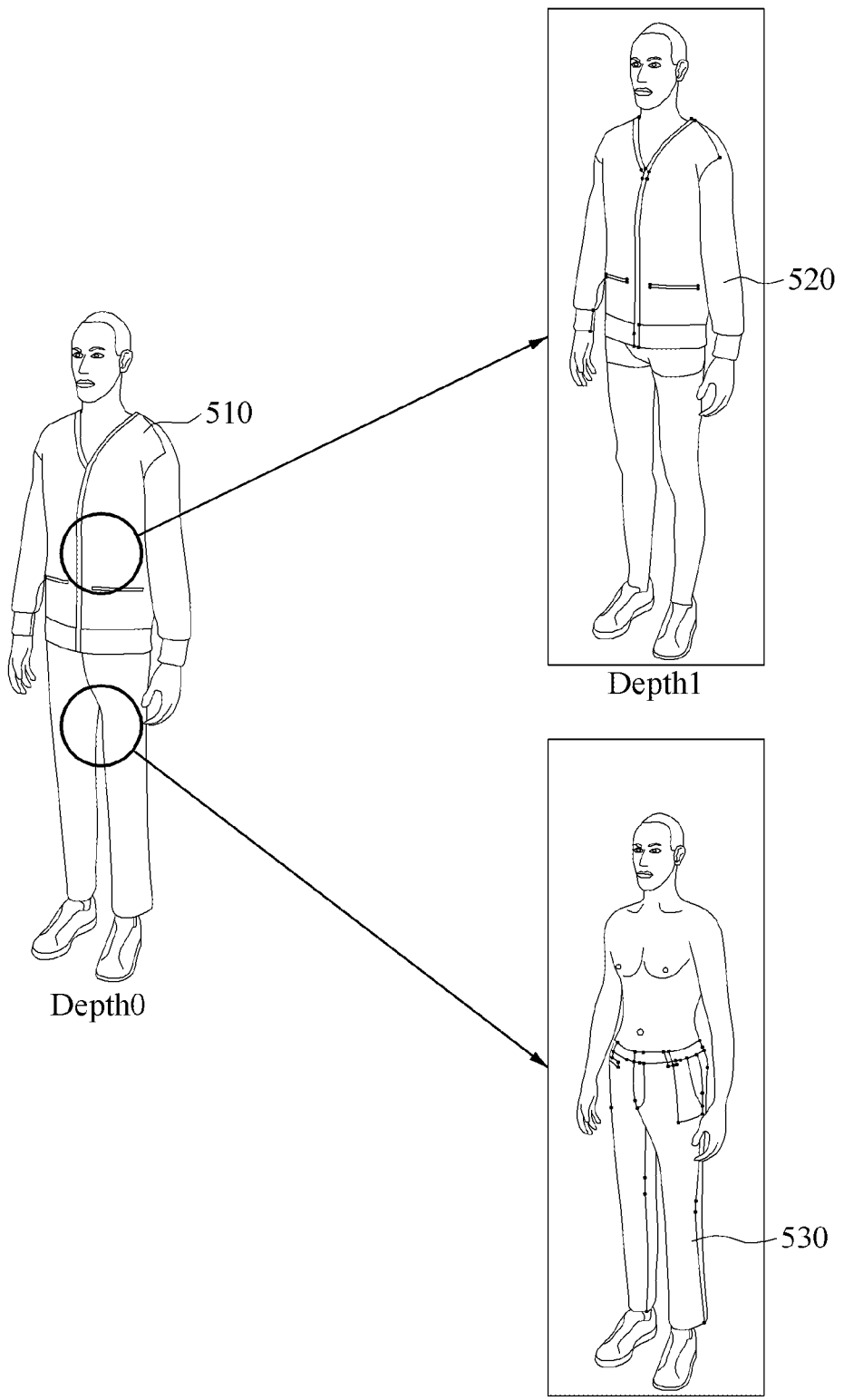

In operation 410, the garment simulation apparatus may activate and visualize a piece selected for operation at the first level when the next level is the first level, as illustrated in FIG. 5B. In operation 420, when the next depth level is a second level displaying 2D patterns 540 and 550 as illustrated in FIG. 5C, the garment simulation apparatus may activate and visualize a 2D pattern selected for the second level.

Figure 5C:
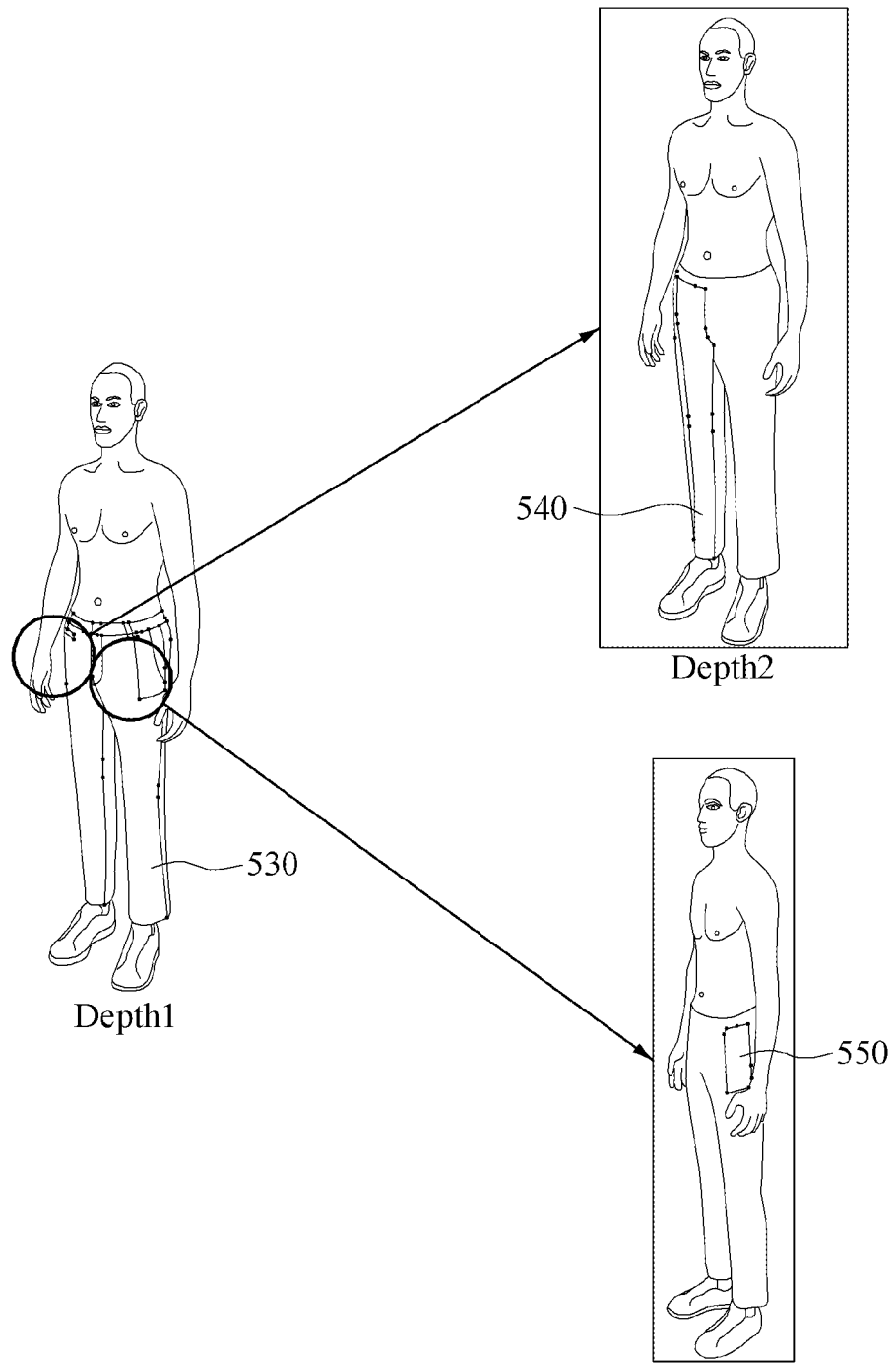

FIGS. 5A to 5C are diagrams illustrating transition between depth levels and visualization, according to an example embodiment. Referring to FIG. 5A, a 3D garment 510 is a displayed object on a screen when a current depth level on the screen is 'Depth 0'. When the depth level is 'Depth 0', a final result of simulation is visualized as is, and no separate UI for modification may be provided.

When the user selects a piece, e.g., a top piece 520 or a bottom piece 530, from a 3D garment 510 displayed on the screen, a screen as shown in FIG. 5B below may be provided. Referring to FIG. 5B, when one area of the 3D garment 510 is selected for modification at Depth 0, either of pieces 520 and 530 is displayed on the screen at Depth 1. The area of the 3D garment 510 may be an area corresponding to either of the pieces 520 and 530.

A garment simulation apparatus may display at Depth 1 by controlling visualization of a plurality of pieces such that a selected piece is not occluded by unselected pieces as a user input is received for making the selection for the piece for Depth 1.

When a pattern is selected by the user from piece 520 or 530 at Depth 1, the garment simulation apparatus may activate editing elements applicable to a next depth level, Depth 2fpr the selected pattern. As the editing elements applicable to the next depth level Depth 2 are activated, the garment simulation apparatus may display Depth 2 on the screen.

Alternatively, a user input for empty spaces other than areas of the screen corresponding to pieces 520 and 530 in a simulation space may be received at Depth 0 where pieces 520 and 530 are displayed. In this case, the garment simulation apparatus may continue to display at Depth 0 without transition to display at Depth 1, which is the next depth level to Depth 0.

Referring to FIG. 5C, 2D patterns 540 and 550 are displayed on the screen when one area corresponding to piece 530 is selected a screen of Depth 1. At this time, different areas of piece 530 may correspond to 2D patterns 540 and 550, respectively. For example, if the user selects a front right area of the piece 530 at Depth 1, the garment simulation apparatus may activate and visualize 2D pattern 540 at the corresponding area. The garment simulation apparatus may visualize objects transparently or translucently and inactivate 2D pattern 540 that was not selected.

According to an example embodiment, when a selected 2D pattern partially or wholly occluded by unselected 2D patterns, the garment simulation apparatus may clearly visualize the selected 2D pattern through the unselected 2D patterns. For example, if the user selects a left pocket area of the piece 530 at Depth 1, the garment simulation apparatus may activate and visualize the selected left pocket area (e.g., 2D pattern 550 corresponding to the left pocket of the bottom). 2D pattern 550 corresponding to the pocket may be partially occluded by the 2D pattern on a left front area of the bottom. The garment simulation apparatus may transparently display a 2D pattern on a left front area of the bottom that would otherwise partially occlude selected 2D pattern 550 so that 2D pattern 550 is clearly visible through the 2D pattern on the left front area of the bottom piece 530.

The garment simulation apparatus may display the unselected one or more of 2D patterns. The garment simulation apparatus may display the unselected one or more of 2D patterns without adjusting a transparency of the unselected one or more of the 2D patterns.

The garment simulation apparatus may visualize unselected 2D patterns in different ways such as opaque, translucent, or transparent display of 2D patterns. The user may select a new 2D pattern according to a degree of visualization of the unselected 2D patterns. For example, when the user newly selects another 2D pattern, the garment simulation apparatus may display a UI configured to edit the other 2D pattern at Depth2. The garment simulation apparatus may provide separate visualization for pieces that are not selected by the user, in a similar manner as the unselected 2D patterns. For example, when a user input for an empty space other than where the piece 530 is received while the piece 530 is displayed at Depth 1, the garment simulation apparatus may transition to Depth 0 and not to Depth 2.

Figure 6:
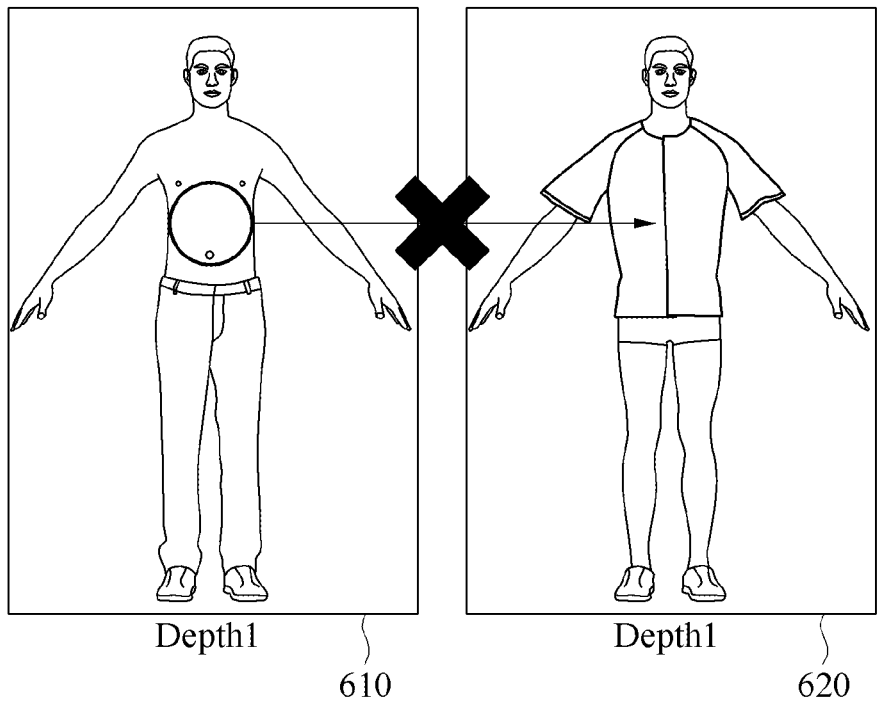
FIG. 6 is a diagram illustrating whether a transition is allowed at the same depth level, according to an example embodiment.
Figure 6:
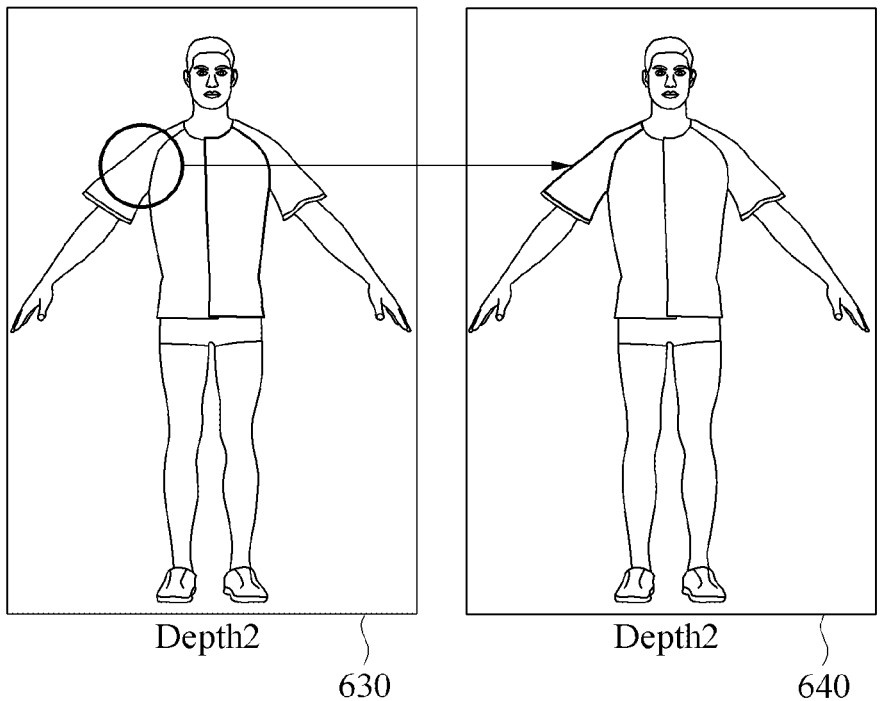

FIG. 6 is a diagram illustrating whether a transition at the same depth level is permitted, according to an example embodiment. Referring to FIG. 6, according to an example embodiment, diagrams 610 and 620 illustrating a situation in which a user input moves between a top piece and a bottom piece at Depth 1. Diagrams 630 and 640 illustrate a situation in which a user input moves between 2D patterns of the top at Depth 2. For example, when the bottom piece is activated as shown in the diagram 610, the top piece may be displayed in a transparent manner. In this case, even if the user selects the top piece that displayed in a transparent manner in diagram 610, the garment simulation apparatus may not visualize a 2D pattern corresponding to the selected top piece as shown in the diagram 620. The object visualized as transparent as shown in diagram 610, in other words, an object (piece or pattern) that is not activated or displayed is not selectable, even if at the same depth level (i.e., transition between the bottom piece and the top piece is not permitted).

Alternatively, for example, as seen in the diagram 630, a 2D pattern on the left side of a front plate included in the top piece may be activated, and 2D patterns included in the bottom piece may be displayed as in a translucent or opaque manner. When other 2D patterns that are not activated in the top piece are also displayed on the screen, and 2D patterns are displayed on the screen in this way, movement at the same depth level is possible even when the 2D patterns are not activated. Similarly, even at Depth 1, if a piece is selected by the user where the piece is displayed in a translucent or opaque manner, transition at the same depth level is permitted even if the piece is not activated. For example, when the user selects a 2D pattern of a sleeve part that is displayed on the screen but not activated as seen in the diagram 630, transitioning to the 2D pattern corresponding to the sleeve part is permitted as shown in the diagram 640. Hence, modification of the 2D pattern corresponding to the sleeve part may be or may not be possible depending on the setting. In other words, when an object is displayed on the screen, the garment simulation apparatus may permit transition between pieces or patterns at the same depth level regardless of whether the pieces or patterns are activated. The modification of the transitioned pieces or patterns after the transitioning may be permitted or not permitted depending on the setting.

Figure 7:
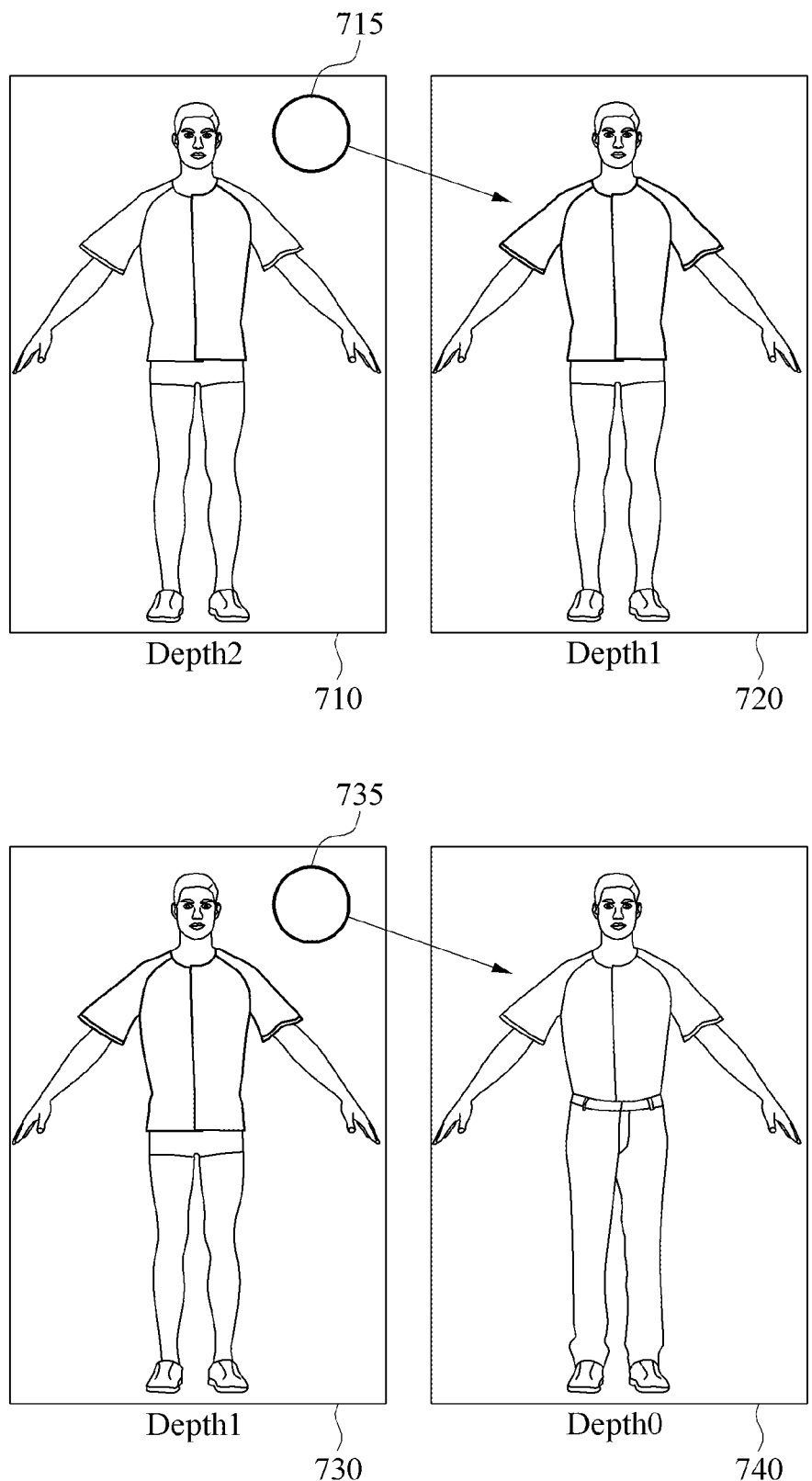
FIG. 7 is a diagram illustrating a method of transitioning to a previous depth level, according to an example embodiment.

FIG. 7 is a diagram illustrating transitioning to a previous depth level, according to an example embodiment. Referring to FIG. 7, in diagrams 710 and 730 illustrating simulation spaces corresponding to depth levels, when a user input is received in empty space 715 and 735 in which objects are not displayed, a transition is made to a previous depth level as shown by diagrams 720 and 740. For example, as shown in diagram 710, if a user input is received at empty space 715 other than space where the object (a top piece) is displayed in Depth 2, the garment simulation apparatus may transition to Depth 1, which is a depth level prior to Depth 2, as shown in screen 720.

According to an example embodiment, the garment simulation apparatus activates editing elements applicable at Depth 1 for application to the top piece so that the top piece selected by the user may be deformed by activated editing elements. Alternatively, a user input may be received in empty space 735 other than an area occupied by the top piece at Depth 1, as shown in diagram 730. In this case, the garment simulation apparatus may transition to Depth 0, which is a depth level prior to Depth 1, as shown in screen 740.

Figure 8:
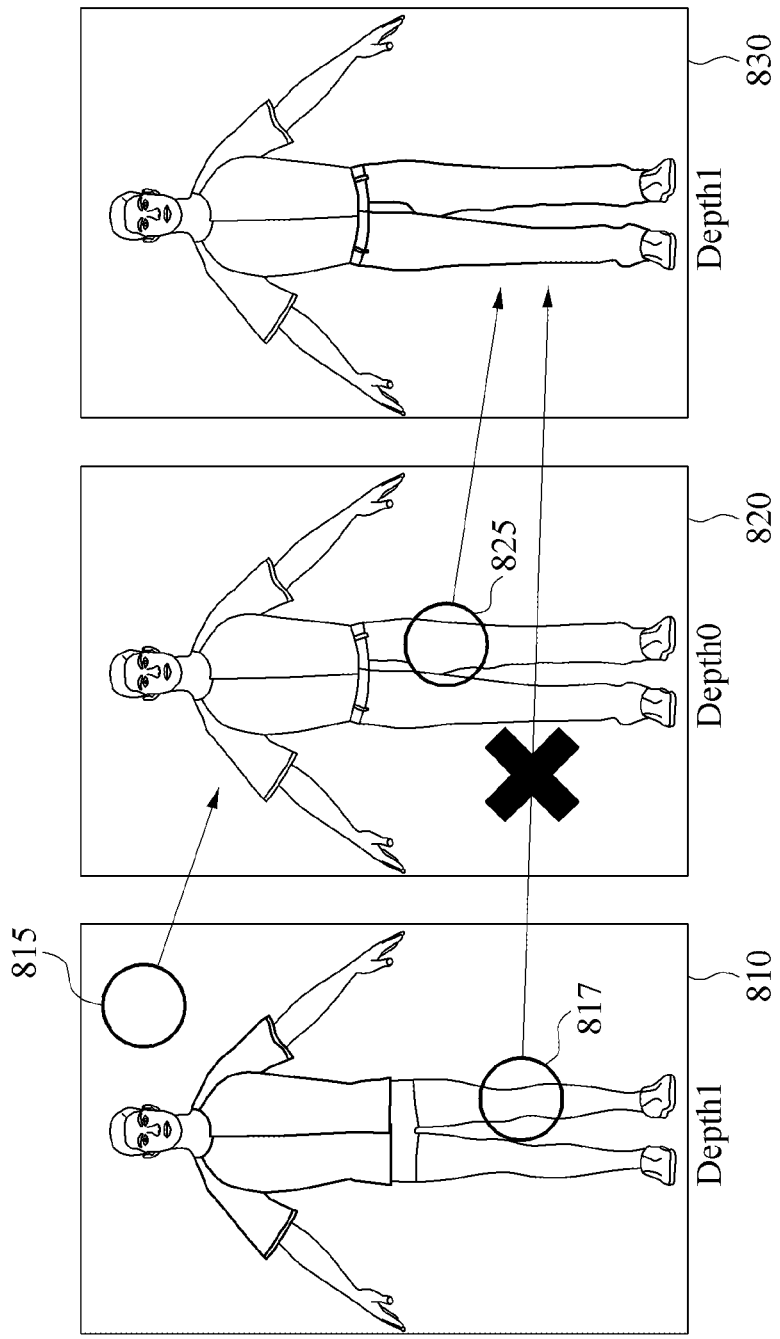
FIG. 8 is a diagram illustrating a method of selecting an object that is not selectable at a current depth level because the object is displayed transparently, according to an example embodiment.

FIG. 8 is a diagram illustrating selecting a piece or a pattern that is not selectable because it is displayed in a transparent manner, according to an example embodiment. For example, the garment simulation apparatus may inactivate a bottom piece by displaying the bottom piece in a transparent manner at Depth 1 as shown in screen 810. As such, an inactive piece displayed in a transparent manner may not be selected by the user. When an object is displayed as transparent, it may not be possible to switch from screen 810 to screen 830 because transition between pieces or patterns at the same depth levels is not permitted.

When the user wants to select a piece or pattern that is deactivated (e.g., shown in a transparent manner) in Depth 1, the user may select an empty space 815 not occupied by a piece so that a transition to Depth 0 may be made, as shown in screen 820. After moving to Depth 0 as shown in screen 820, the user may select the bottom piece as screen 830 by selecting area 825 corresponding to the bottom piece in a 3D garment displayed on screen 820.

Figure 9:
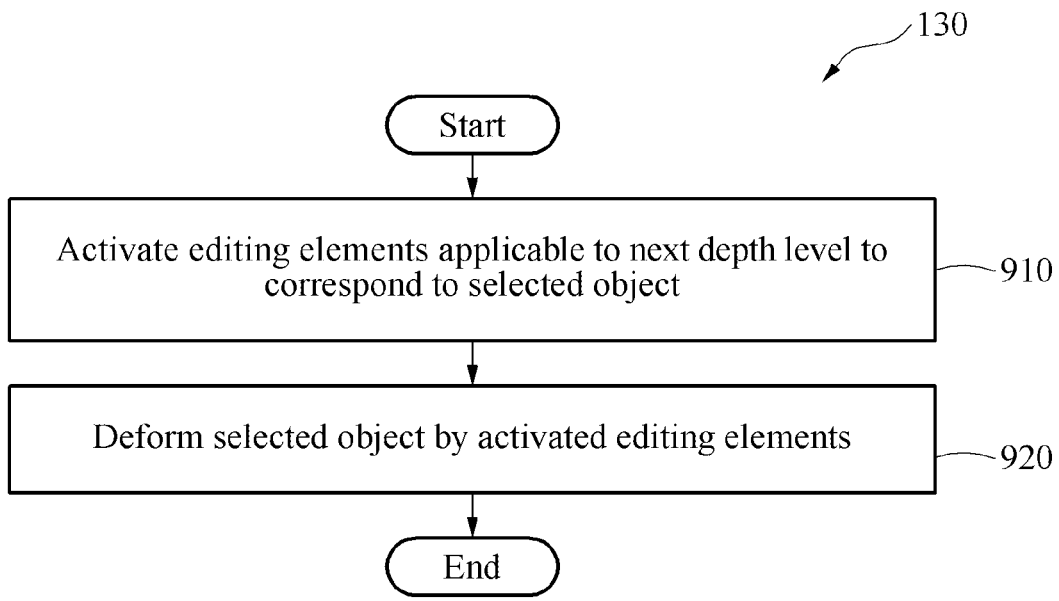
FIG. 9 is a flowchart illustrating a method of deforming a selected object, according to an example embodiment.

FIG. 9 is a flowchart illustrating a method of deforming a selected object, according to an example embodiment. In an example embodiment, each operation may be sequentially performed, but not necessarily in a sequential order. For example, the order of each operation may be changed, and at least two operations may be performed in parallel.

Referring to FIG. 9, a process of deforming a selected object through operations 910 and 920 by a garment simulation apparatus according to an example embodiment is illustrated. For example, operations 910 to 920 below may be performed by the processor 1130 of the garment simulation apparatus 1100 illustrated in FIG. 11.

In operation 910, the garment simulation apparatus may activate editing elements applicable the selected object in a next depth level. For example, when the next depth level is a first level displaying pieces, the garment simulation apparatus may activate editing elements for editing selected pieces corresponding to the first level. In this case, the garment simulation apparatus may allow a UI to be visualized to correspond to entire pieces selected in Depth 1.

Alternatively, when the next depth level is a second level displaying 2D patterns, the garment simulation apparatus may activate editing elements for editing a selected 2D pattern at the second level. In this case, the garment simulation apparatus may visualize a UI corresponding to a selected 2D pattern at Depth 2.

In operation 910, the garment simulation apparatus may activate the editing elements applicable to the next depth level for the selected object, according to an editing function setting. Here, the 'editing function' may include functions such as, for example, applying fabric to the 3D garment, adjusting length of a pattern, adjusting width, changing silhouette, changing an inner line, and adding an inner line, but is not necessarily limited thereto. The editing function may be set, for example, through various tools. 'Editing elements' may include at least one of, for example, a first UI configured to edit a surface of any one of 3D garments, pieces, and 2D patterns, a second UI configured to edit a line of any one of the pieces and the 2D patterns, a third UI configured to edit a point of any one of the pieces and the 2D patterns, and a fourth UI configured to edit a subsidiary material corresponding to any one of the 3D garment, the pieces, and the 2D patterns. Line edited by the second UI may include a sewing line and a style line in addition to outlines indicating the shapes of the garments, the pieces, and the 2D patterns described above.

A method for the garment simulation apparatus to visualize a UI corresponding to a depth level for each function will be described in more detail with reference to FIG. 10 below.

In operation 920, the garment simulation apparatus may deform a selected object by the editing elements activated in operation 910. The garment simulation apparatus may deform the selected object to correspond to a user input for selecting any one of a plurality of objects which is generated in an editing mode for editing the selected object.

FIGS. 10A to 10D are diagrams illustrating a method of visualizing a UI corresponding to a depth level for each function according to an example embodiment. According to an example embodiment, functions performed at each depth level may vary, and accordingly, the garment simulation apparatus may visualize an object (e.g., a piece or a pattern) in a different manner according to functions that may be performed at each depth level.

The garment simulation apparatus may visualize a UI at a depth level at which the function is operable. The garment simulation apparatus may simultaneously provide editing elements that may be visualized according to the function. The garment simulation apparatus may provide, for example, a visualization of a point and a visualization of a point and a line together corresponding to a selectable function.

For example, the garment simulation apparatus may visualize a UI corresponding to points and lines in Depth 1 and Depth 2, in other words, display control points to enable edition of the lines and points. Accordingly, the user may perform, for example, functions that may be performed through the control points such as, modifying a style line, changing an area and/or length of a 2D pattern, and changing a silhouette, at Depth 1 and Depth 2.

In addition, the garment simulation apparatus may visualize a UI corresponding to a surface at Depth 0 to enable editing of a garment surface. Accordingly, the user may perform, for example, functions that may be performed without a control point, such as applying fabric properties to patterns or garments, changing fabrics, and changing colors at Depth 0. At 'Depth 0, the control points do not appear, so editing of the style line is not enabled.

The garment simulation apparatus may store the current depth level, and as the depth level changes, values indicative of the current depth level may be adjusted accordingly.

Hereinafter, referring to FIGS. 10A to 10D, a method of providing visualization according to various functions by the garment simulation apparatus will be described.

Figure 10A:
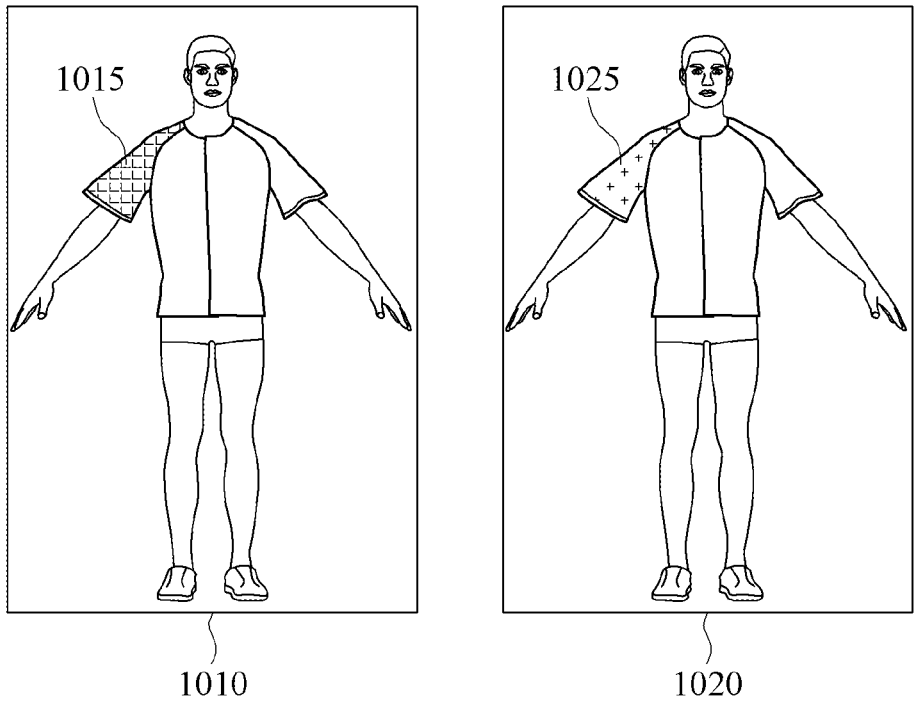
FIGS. 10A to 10D are diagrams illustrating a method of visualizing a UI corresponding to a depth level for each function, according to an example embodiment.

Referring to FIG. 10A, screens 1010 and 1020 performing a function of applying different fabric to the pattern of a sleeve area of a top piece at 'Depth 1' according to an example embodiment are illustrated.

The garment simulation apparatus may display outlines of 2D patterns forming the top piece in the top piece at Depth 1 to better distinguish the 2D patterns. The garment simulation apparatus may facilitate pattern identification by displaying the outlines of the 2D patterns forming the top piece, such as the screen 1010 or the screen 1020. For example, when the user hovers over the 2D patterns 1015 and 1025 of a sleeve part in the top piece displayed on the screen 1010 or the screen 1020 with a mouse, the garment simulation apparatus may high light the sleeve part corresponding the 2D patterns 1015 and 1025.

The garment simulation apparatus may display selected 2D pattern in a different color than the unselected one or more 2D patterns.

The garment simulation apparatus may highlight selected 2D pattern. While highlighting the selected 2D pattern, the garment simulation apparatus may not highlight the unselected one or more 2D patterns When the user selects a highlighted sleeve part, the garment simulation apparatus may activate applicable editing elements (e.g., a function of applying fabric) while maintaining the highlight effect on the part. For example, when the user selects empty space other than an area occupied by the top piece (i.e., a background area), the selection of the 2D patterns 1015 and 1025 of the sleeve part may be canceled, and the highlighting for the previously selected part may be removed.

Figure 10B:
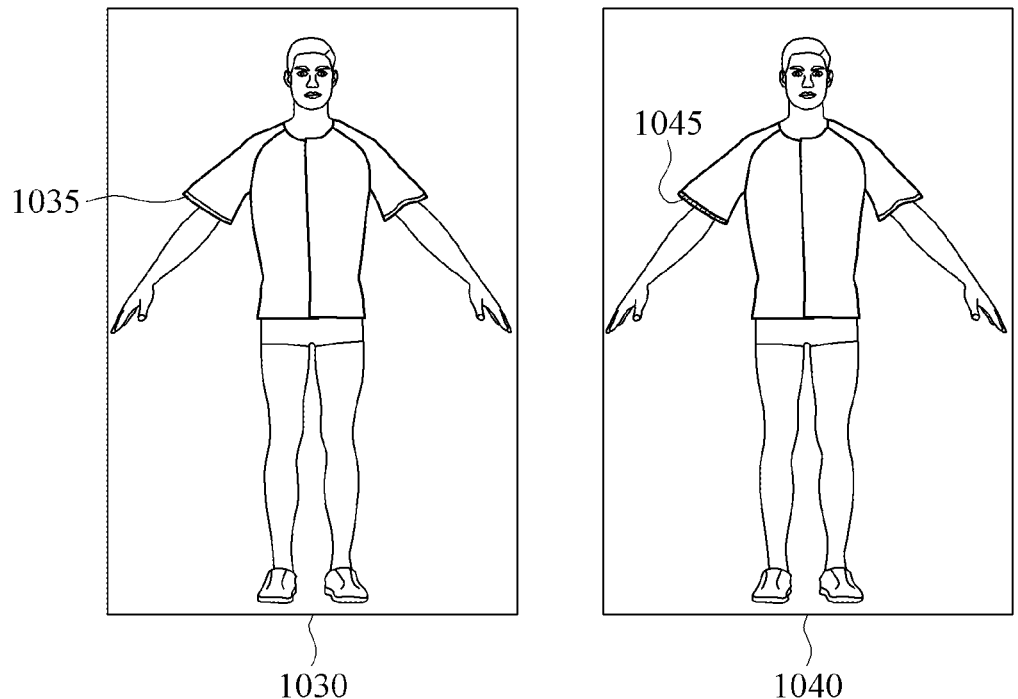

Referring to FIG. 10B, screens 1030 and 1040 performing a function of adjusting length or width of a part of the top piece at 'Depth 1' and 'Depth 2' according to an example embodiment are illustrated.

The garment simulation apparatus may display outlines of the top piece corresponding to 'Depth 1' or outlines of 2D patterns forming the top piece at 'Depth 2', so that lengths and/or widths corresponding to lines selected from the top piece and/or lines selected from the 2D patterns are adjustable.

For example, when a line 1035 of a sleeve part on the screen 1030 is hovered with the mouse, the garment simulation apparatus may apply a highlight effect to a line 1045 of a sleeve part as seen in the screen 1040, or may cause the line 1045 of the sleeve part to be displayed in a different color. When the line 1045 of the sleeve part is selected by clicking the mouse, the garment simulation apparatus may maintain the highlighting or displaying in the different color of the line 1045 of the sleeve part as it is. When the user selects empty space other than an area occupied by the top piece on the screen 1030 or the screen 1040 (i.e., the background area), the selection of the line 1045 of the sleeve part is canceled and the highlight or color change for the part may be turned off.

For example, at Depth 2, only one 2D pattern among 2D patterns forming the top piece may be visualized. For example, when a 2D pattern selected by the user is wholly or partially occluded by other unselected 2D patterns, the garment simulation apparatus may clearly visualize the selected 2D pattern through the other 2D patterns. The garment simulation apparatus visualizes the selected 2D pattern through the other 2D patterns such that the selected 2D pattern is shown to be transmitted through the other 2D patterns like X-rays, so that the selected 2D pattern may be displayed preferentially over the other 2D patterns that cover the selected 2D pattern.

Figure 10C:
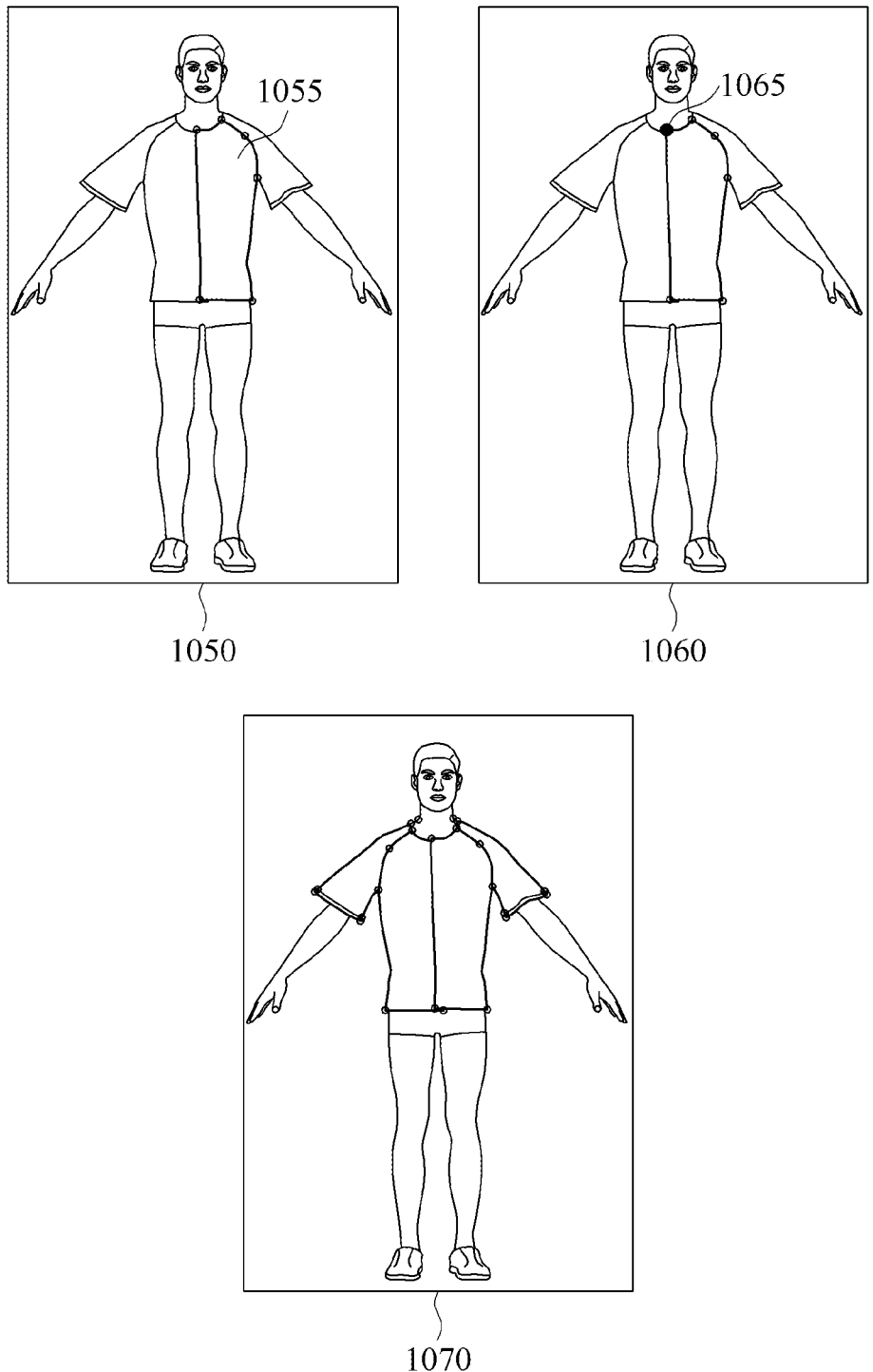

Referring to FIG. 10C, screens 1050, 1060, and 1070 for selecting points on the top piece at Depth 1 and Depth 2, according to an example embodiment are illustrated. By displaying points on the outlines of the 2D patterns forming the top piece at Depth 2, the garment simulation apparatus may perform a function such as adjusting length and/or width corresponding to a selected point in the top piece and/or a selected point in the 2D pattern. A point displayed the outline may correspond to a control point that enables a change in the length and/or area of the line.

For example, when a front left pattern 1055 of the top piece is selected on the screen 1050 by the user, the garment simulation apparatus may display the outline of the pattern 1055 using a thicker line and points on the outline using a larger size. When the user hovers the mouse over point 1065 on the pattern 1055 as shown in screen 1060, the garment simulation apparatus may apply a highlight effect or a color change effect to the point 1065. When the user selects the point 1065 through a mouse click or the like, the highlight effect or the color change effect for the point 1065 may be maintained. An indication that selected point 1065 is pressed may be displayed on the screen.

When the user selects an empty space other than an area occupied by the top piece on the screen 1060 (i.e., the background area), the selection of the point 1065 may be canceled, and the highlight or color change of the part may be turned off.

For example, when the front left pattern 1055 of the top piece including the point 1065 is partially or wholly occluded by another pattern, the garment simulation apparatus may allow the 2D pattern 1055 to be preferentially selectable over the other 2D pattern that covers the 2D pattern by making the 2D pattern 1055 appear as shown in an X-ray radiograph.

Also, at Depth 1, the garment simulation apparatus may display all of the outlines and/or points on the outlines of the 2D patterns forming the top piece, as shown in screen 1070. Accordingly, the user may edit the style lines for the entire top piece, change of the inner line, the area and/or length of the 2D patterns, the silhouette, and the like.

Figure 10D:
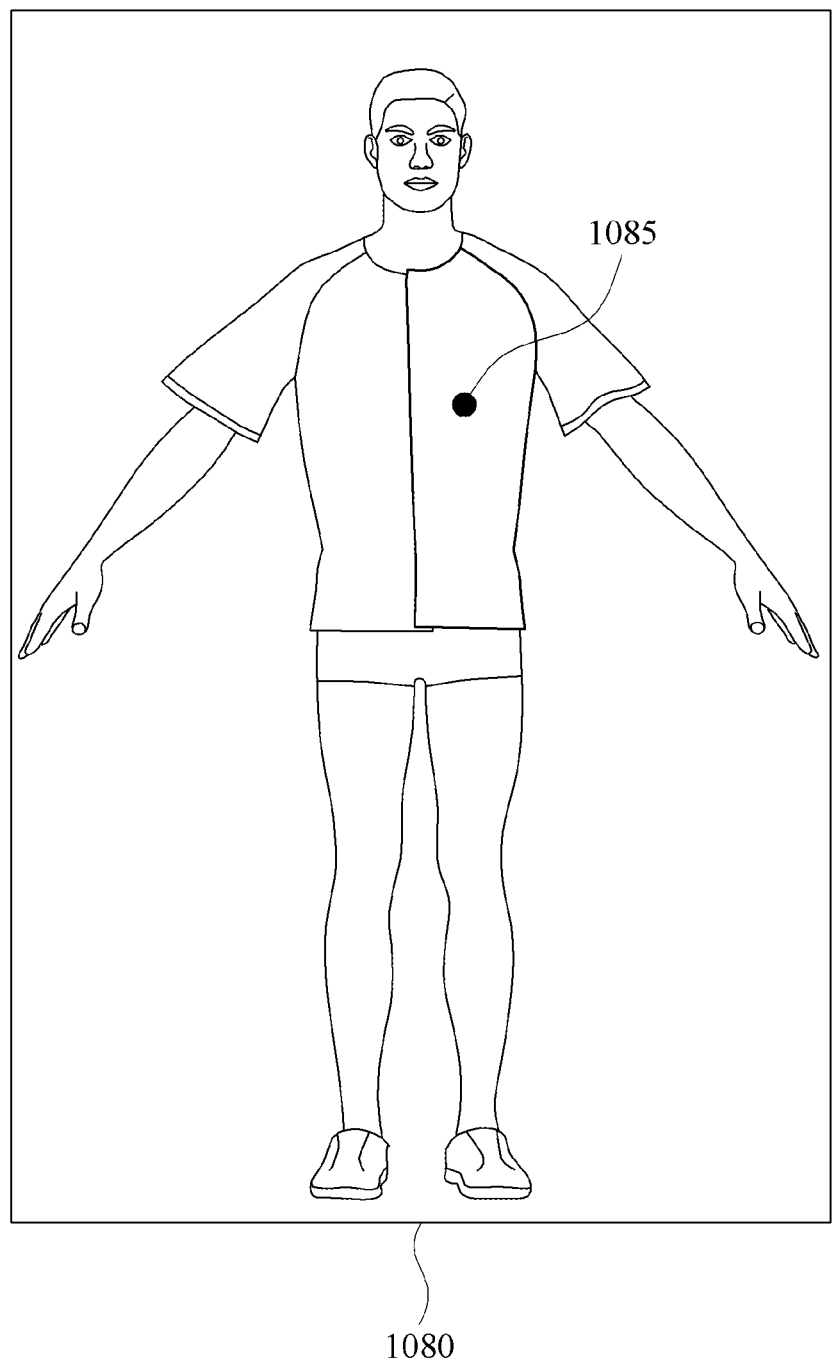

Referring to FIG. 10D, a screen 1080 performing a function of adding a supplemental material to the top piece, according to an example embodiment is illustrated. Supplemental materials to be added include, among others, a graphic pattern, a button, a zipper, pattern attachment, or texts, applicable to all depth levels.

For example, if the user performs a function of adding the supplemental material to point 1085 of a front left pattern of the top piece as shown in screen 1080, the garment simulation apparatus may display the supplemental material selected by the user for adding to point 1085. When the user selects the supplemental material to be added to point 1085 by clicking the mouse and the like, the garment simulation apparatus may apply the highlight effect to the selected supplemental material.

Figure 11:
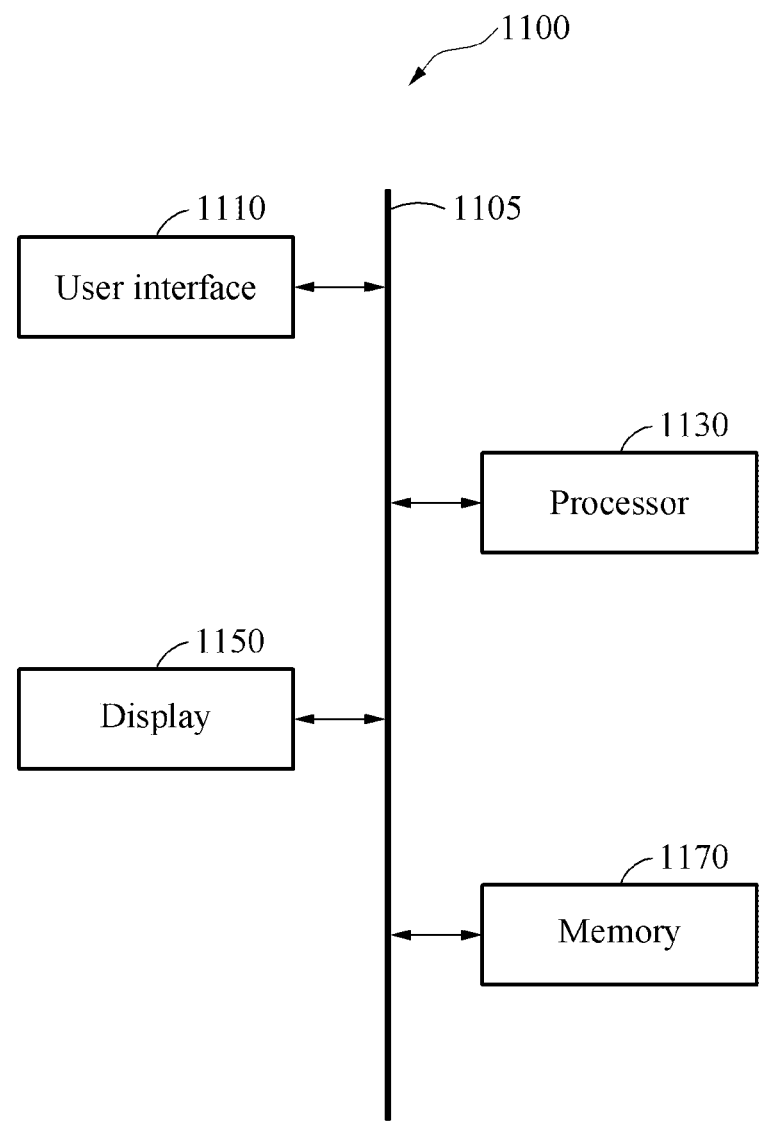
FIG. 11 is a block diagram of a garment simulation apparatus according to an example embodiment.

FIG. 11 is a block diagram of a garment simulation apparatus according to an example embodiment. Referring to FIG. 11, the garment simulation apparatus 1100 according to an example embodiment may include a UI 1110, the processor 1130, a display 1150, and a memory 1170. The UI 1110, the processor 1130, the display 1150, and the memory 1170 may be connected one another through a communication bus 1105.

The UI 1110 receives a user input for selecting, in a simulated 3D garment worn on an avatar, any one of a plurality of objects corresponding to a next depth level to a depth level which is being currently displayed among depth levels for hierarchically displaying one or more pieces included in the 3D garment and 2D patterns forming each of the pieces. The UI 1110 may receive user input for a 3D garment, a piece, and/or a 2D pattern displayed in a 3D space through, for example, such as a stylus pen, a mouse click, and/or a touch input by the user's finger.

Also, the UI 1110 may receive a user input for an empty space other than a plurality of objects in a simulation space in which the plurality of objects are displayed.

The processor 1130 displays a next depth level by controlling visualization of the plurality of objects such that a selected object through the UI 1110 is not covered by at least one of the remaining objects other than the selected object through the UI 1110 of the plurality of objects. The processor 1130 deforms a selected object, based on an input for editing the selected object through the UI 1110 corresponding to a next depth level. The processor 1130 deforms a 3D garment by reflecting deformation of the selected object through the UI 1110. The processor 1130 may activate and visualize the selected object. In addition, the processor 1130 may inactivate the at least one of the remaining objects other than the selected object to visualize it transparently or translucently.

For example, when a next depth level is a first level displaying pieces, the processor 1130 may activate and visualize any one piece selected to correspond to the first level, and when the next depth level is a second level displaying 2D patterns, the processor 1130 may activate and visualize a selected 2D pattern to correspond to the second level. At this time, when a selected 2D pattern is covered by other 2D patterns that are not selected, the processor 1130 may clearly visualize the selected 2D pattern through the other 2D patterns.

For example, when the UI 1110 receives a user input for an empty space other than a plurality of objects in a simulation space, the processor 1130 may maintain a depth level which is being currently displayed without displaying a next depth level to correspond to the user input for the empty space.

The display 1150 displays 3D garments deformed by the processor 1130.

The memory 1170 may store the 3D garments deformed by the processor 1130. In addition, the memory 1170 may store various information generated in the processes of the above-mentioned processor 1130. In addition, the memory 1170 may store various data and programs. The memory 1170 may include a volatile memory or a non-volatile memory. The memory 1170 may include a mass storage medium such as a hard disk to store various data.

Also, the processor 1130 may perform at least one of the methods described above with reference to FIGS. 1 to 10 or an algorithm corresponding to the at least one method. The processor 1130 may be a hardware-implemented data processing device having a circuit having a physical structure for executing desired operations. For example, the desired operations may include code or instructions included in a program. The processor 1130 may include, for example, a central processing unit (CPU), a graphics processing unit (GPU), or a neural network processing unit (NPU). For example, the garment simulation apparatus 1100 implemented in hardware may include a microprocessor, a central processing unit, a processor core, a multi-core processor, a multiprocessor, application-specific integrated circuit (ASIC), and a field programmable gate array (FPGA).

The processor 1130 may execute a program and control the garment simulation apparatus 1100. A program code executed by the processor 1130 may be stored in the memory 1170.

The methods according to example embodiments may be embodied in the form of program instructions that are executable by various computer means and recorded on non-transitory computer-readable media. The computer-readable media may include, alone or in combination with the program instructions, data files, data structures, and the like. The program instructions recorded on the media may be those specially designed and constructed for the purposes of the example embodiments, or they may be of the well-known kind and available to those having skill in the computer software arts. Examples of non-transitory computer-readable media include magnetic media such as hard disks, floppy disks, and magnetic tape; optical media such as CD-ROMs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as code produced by a compiler, and high-level language code executable by a computer using an interpreter or the like. The described hardware devices may be configured to act as one or more software modules in order to perform the operations of the above-mentioned example embodiments, or vice versa.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, or computer storage medium or device, to provide instructions or data to or be interpreted by the processing device. The software also may be distributed over network coupled computer systems so that the software is stored and executed in a distributed fashion. The software and data may be stored by one or more non-transitory computer readable recording mediums.

While example embodiments have been described with reference to the limited drawings as described above, it will be apparent to one of ordinary skill in the art that various technical changes and modifications may be made based on the foregoing. For example, suitable results may be achieved if the described techniques are performed in a different order, and/or if components in a described system, architecture, device, or circuit are combined in a different manner and/or replaced or supplemented by other components or their equivalents.

What is claimed is:

1. A garment simulation method, the method comprising:
    displaying a piece of a three-dimensional (3D) garment at a first depth level where a first granular level of editing is enabled for the piece, the piece comprising two-dimensional (2D) patterns;
    receiving selection of one of the 2D patterns responsive to displaying the piece;
    displaying, at a second depth level, by visualizing the selected 2D pattern in a manner in which the selected 2D pattern is not occluded by unselected one or more 2D patterns or other pieces of the 3D garment, wherein a second granular level of editing that is finer than the first granular level is enabled for the selected 2D pattern in the second depth level;
    receiving first input to deform the selected 2D pattern in the second depth level responsive to display the selected 2D pattern; and
    displaying a deformed version of the selected piece by reflecting the deformation of the selected pattern.

2. The method of claim 1, wherein the first level of editing comprises editing an overall configuration of the selected piece but not configurations of the 2D patterns, and the second level of editing comprises editing a configuration of the selected 2D pattern.

3. The method of claim 1, wherein the 3D garment is placed on an avatar.

4. The method of claim 1, wherein the displaying of the selected 2D pattern comprises displaying the unselected one or more 2D patterns without adjusting a transparency of the unselected one or more of 2D patterns.

5. The method of claim 1, wherein the displaying of the selected 2D pattern comprises displaying the unselected one or more patterns of the piece transparently or translucently or
    lower selection priority of the unselected one or more 2D patterns of the piece.

6. The method of claim 5, wherein the displaying of the selected 2D pattern comprises
    displaying at least one of outlines of the selected 2D pattern and points on the outlines of the 2D patterns.

7. The method of claim 5, wherein the displaying of the selected 2D pattern comprises
    displaying selected 2D pattern in a different color than unselected one or more 2D patterns or
    highlighting selected 2D pattern.

8. The method of claim 1, further comprising:
    displaying a plurality of pieces of the 3D garment including the selected piece in a zero depth level where editing is disabled for the plurality of pieces; and
    receiving selection of the plurality of pieces of the 3D garment responsive to displaying the 3D garment in the zero depth level.

9. The method of claim 1, further comprising displaying the selected pattern in a conspicuous manner to indicate activation of the selected pattern for editing in the second depth level.

10. The method of claim 1, further comprising displaying user interfaces (UIs) for editing the selected 2D pattern responsive to receiving selection of the one of the 2D patterns.

11. The method of claim 1, further comprising:
    receiving second input at an empty space other than at a region of a screen occupied by the 2D patterns responsive displaying at the second depth level; and
    displaying the selected piece at the first depth level responsive to receiving the second input.

12. The method of claim 1, further comprising activating a first set of editing elements in user interfaces (UIs) applicable to the piece in the first depth level responsive to displaying at the first depth level.

13. The method of claim 12, wherein the first set of editing elements comprises at least one of a first element configured to edit a surface of the piece, a second element configured to edit a line of the piece, a third element configured to edit a point of the piece, and a fourth element configured to edit a supplemental material corresponding to the piece.

14. The method of claim 13, further comprising activating a second set of editing elements in user interfaces (UIs) applicable to the selected 2D pattern in the second depth level responsive to displaying at the second depth level.

15. The method of claim 14, wherein the second set of editing elements comprises at least one of a fifth element configured to edit a surface of the selected 2D pattern, a sixth element configured to edit a line of the selected 2D pattern, a seventh element configured to edit a point of the selected 2D pattern, and an eighth element configured to edit a supplemental material corresponding to the selected 2D pattern.

16. The method of claim 1, further comprising:
   activating a sub tool usable in parallel with an editing function responsive to receiving second input of a preset type in a simulation space where the 3D garment is displayed, the sub tool comprising at least one of:
   a depth level selection tool configured to transition between depth levels including the first depth level and the second depth level;
   a line editing tool configured to edit a style line in the 3D garment, or pieces of the 3D garment; and
   a sewing tool configured to perform sewing in response to modification of sewing lines of the selected 2D pattern.

17. A non-transitory computer-readable storage medium storing instructions therein, the instructions when executed by a processor cause the processor to:
   display a piece of a three-dimensional (3D) garment at a first depth level where a first granular level of editing is enabled for the piece, the piece comprising two-dimensional (2D) patterns;
   receive selection of one of the 2D patterns responsive to displaying the piece;
   display, at a second depth level, by visualizing the selected 2D pattern in a manner in which the selected 2D pattern is not occluded by unselected one or more 2D patterns or other pieces of the 3D garment, wherein a second granular level of editing that is finer than the first granular level is enabled for the selected 2D pattern in the second depth level;
   receive first input to deform the selected 2D pattern in the second depth level responsive to display the selected 2D pattern; and
   display a deformed version of the selected piece by reflecting the deformation of the selected pattern.

18. The non-transitory computer-readable storage medium of claim 17, wherein the first level of editing comprises editing an overall configuration of the selected piece but not configurations of the 2D patterns, and the second level of editing comprises editing a configuration of the selected 2D pattern.

19. The non-transitory computer-readable storage medium of claim 17, wherein the 3D garment is placed on an avatar.

20. The non-transitory computer-readable storage medium of claim 17, wherein the displaying of the selected 2D pattern comprises displaying the unselected one or more 2D patterns without adjusting a transparency of the one or more of the unselected 2D patterns.

21. The non-transitory computer-readable storage medium of claim 17, wherein the displaying of the selected 2D pattern comprises displaying the unselected one or more patterns of the piece transparently or translucently or lower selection priority of the unselected one or more patterns of the piece.

22. The non-transitory computer-readable storage medium of claim 17, wherein the displaying of the selected 2D pattern comprises
   displaying at least one of outlines of the selected 2D pattern and points on the outlines of the 2D patterns.

23. The non-transitory computer-readable storage medium of claim 17, wherein the displaying of the selected 2D pattern comprises
   displaying selected 2D pattern in a different color than unselected one or more 2D patterns or highlighting selected 2D pattern.

24. The non-transitory computer-readable storage medium of claim 17, wherein the instructions further cause the processor to:
   display a plurality of pieces of the 3D garment including the selected piece in a zero depth level where editing is disabled for the plurality of pieces; and
   receive selection of the plurality of pieces of the 3D garment responsive to displaying the 3D garment in the zero depth level.

25. The non-transitory computer-readable storage medium of claim 17, further comprising instructions that cause the processor to display the selected pattern in a conspicuous manner to indicate activation of the selected pattern for editing in the second depth level.

26. A computing device, comprising:
   a processor; and
   a memory coupled to the processor and storing instructions thereon, the instructions when executed by the processor cause the processor to:
      display a piece of a three-dimensional (3D) garment a first depth level where a first granular level of editing is enabled for the piece, the piece comprising two-dimensional (2D) patterns;
      receive selection of one of the 2D patterns responsive to displaying the piece;
      display, at a second depth level, by visualizing the selected 2D pattern in a manner in which the selected 2D pattern is not occluded by unselected one or more 2D patterns or other pieces of the 3D garment, wherein a second granular level of editing that is finer than the first granular level is enabled for the selected 2D pattern in the second depth level;
      receive first input to deform the selected 2D pattern in the second depth level responsive to display the selected 2D pattern; and
      display a deformed version of the selected piece by reflecting the deformation of the selected pattern.

* * * * *